(12) United States Patent
Gorny et al.

(10) Patent No.: US 7,265,170 B2
(45) Date of Patent: Sep. 4, 2007

(54) POLYCARBONATE OR POLYESTER CARBONATE CONTAINING OPTICAL BRIGHTENERS

(75) Inventors: Rüdiger Gorny, Moon Township, PA (US); Siegfried Anders, Köln (DE); Wolfgang Nising, St. Augustin (DE); Marco Roelofs, Krefeld (DE)

(73) Assignee: Bayer MaterialScience AG, Leverkusen (DE)

( * ) Notice: Subject to any disclaimer, the term of this patent is extended or adjusted under 35 U.S.C. 154(b) by 253 days.

(21) Appl. No.: 10/669,423

(22) Filed: Sep. 24, 2003

(65) Prior Publication Data

US 2004/0063821 A1    Apr. 1, 2004

(30) Foreign Application Priority Data

Sep. 30, 2002    (DE) ................ 102 45 705

(51) Int. Cl.
C08K 5/34    (2006.01)
(52) U.S. Cl. .......................... 524/89; 524/94
(58) Field of Classification Search ............. 524/89, 524/94
See application file for complete search history.

(56) References Cited

U.S. PATENT DOCUMENTS

| | | | | |
|---|---|---|---|---|
| 3,843,632 | A | * 10/1974 | Matsuo et al. | 548/235 |
| 3,993,659 | A | * 11/1976 | Meyer | 548/220 |
| 4,129,412 | A | * 12/1978 | Gunther et al. | 8/648 |
| 4,404,300 | A | 9/1983 | Koski et al. | 524/91 |
| 4,447,350 | A | * 5/1984 | Martini et al. | 252/301.22 |
| 4,666,627 | A | 5/1987 | Meyer | 252/301.22 |
| 5,294,510 | A | * 3/1994 | Ueda et al. | 430/59.1 |
| 5,759,671 | A | * 6/1998 | Tanaka et al. | 428/166 |
| 5,783,307 | A | * 7/1998 | Fagerburg et al. | 428/412 |
| 5,837,757 | A | * 11/1998 | Nodera et al. | 524/87 |
| 6,664,313 | B2 | 12/2003 | Hirai et al. | 523/209 |

FOREIGN PATENT DOCUMENTS

| | | |
|---|---|---|
| DE | 1 955 310 | 5/1971 |
| DE | 33 13 332 | 10/1984 |
| DE | 38 18 986 | 12/1988 |
| EP | 240 461 | 4/1991 |
| EP | 791 680 | 8/1997 |
| EP | 1 217 040 | 6/2002 |
| GB | 1 395 358 | 5/1975 |
| JP | 62-48690 | 10/1987 |
| JP | 1-169327 | 7/1989 |
| JP | 1-192816 | 8/1989 |
| JP | 2-33321 | 2/1990 |
| JP | 3-65948 | 3/1991 |
| JP | 7-233314 | 9/1995 |
| JP | 10-316873 | 12/1998 |
| JP | 2000-191918 | 7/2000 |
| JP | 2001-10210 | 1/2001 |
| JP | 2002-3710 | 1/2001 |
| JP | 2001-214049 | 7/2001 |
| WO | 00/44830 | 8/2000 |
| WO | 01/18130 | 3/2001 |
| WO | 02/31035 | 4/2002 |

OTHER PUBLICATIONS

Database CA 'Online! Chemical Abstracts Service, Columbus, Ohio, US; Takuma Hirosuke et al: "UV-detecting resin compositions" retrieved from STN Database accession No. 112:57556 XP002267299 Zusammenfassung & JP 01 169327 A (Mitsui Toatsu Chemicals, Inc., Japan) Jul. 4, 1989.

(Continued)

Primary Examiner—Kriellion Sanders
(74) Attorney, Agent, or Firm—Joseph C. Gil

(57) ABSTRACT

A thermoplastic molding composition characterized by its optical brightness and good weathering resistance is disclosed. The composition contains a poly(ester) carbonate an optical brightener conforming to

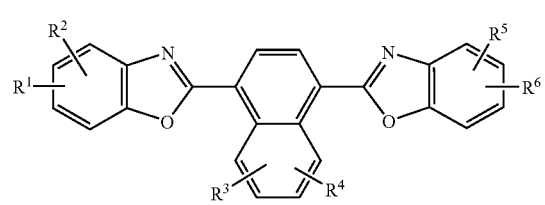

(1)

where $R^1$, $R^2$, $R^3$ $R^4$, $R^5$ and $R^6$ independently denote H, alkyl, aryl, heteroaryl or halogen, or

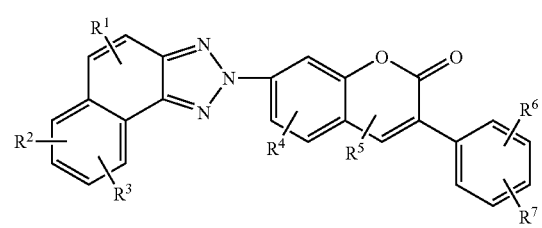

(2)

where $R^1$, $R^2$, $R^3$, $R^4$, $R^5$, $R^6$ and $R^7$ mutually independently stand for H, alkyl, aryl, heteroaryl, halogen or a cyano group.

5 Claims, No Drawings

OTHER PUBLICATIONS

Database CA 'Online! Chemical Abstracts Service, Columbus, Ohio, US; Hodaka, Toshimasa et al: "Thermoplastic laminated sheets with continuous color gradations and their applications" retrieved from STN Database accession No. 138:188993 XP002267300 Zusammenfassung & JP 2003 053908 A (Teijin Chemicals Ltd., Japan) Feb. 26, 2003.

Database CA 'Online! Chemical Abstracts Service, Columbus, Ohio, US; Ishii, Kazuhiko et al: "Polycarbonate compositions with good heat stability and improved reflection properties for reflectors" retieved from STN Database accession No. 137:263820 XP002267301 Zusammenfassung & JP 2002 284978 A (Mitsubmishi Engineering-Plastic Corporation, Japan) Oct. 3, 2002.

Helvetica Chimica Acta, vol. 61, (month unavailable) 1978, pp. 488-500, Erika Schmidt, Hans Loeliger and René Zürcher, "What is the 'Solvent' Effect on the Electronic Spectra of a Solute in a Polymer Matrix?".

* cited by examiner

POLYCARBONATE OR POLYESTER CARBONATE CONTAINING OPTICAL BRIGHTENERS

CROSS REFERENCE TO RELATED PATENT APPLICATION

The present patent application claims the right of priority under 35 U.S.C. §119 (a)-(b) of German Patent Application No.102 45 705.0 filed Sep. 30, 2002, which is incorporated herein by reference in its entirety.

FIELD OF THE INVENTION

The invention concerns thermoplastic molding compositions and more particularly compositions containing poly (ester) carbonate and an optical brightener.

SUMMARY OF THE INVENTION

A thermoplastic molding composition characterized by its optical brightness and good weathering resistance is disclosed. The composition contains a poly(ester) carbonate an optical brightener conforming to

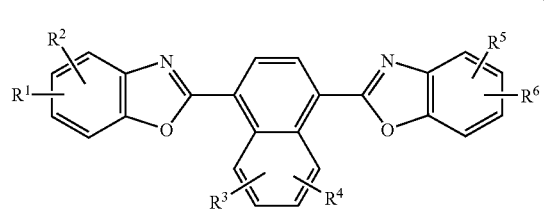

(1)

where $R^1$, $R^2$, $R^3$ $R^4$, $R^5$ and $R^6$ independently denote H, alkyl, aryl, heteroaryl or halogen, or

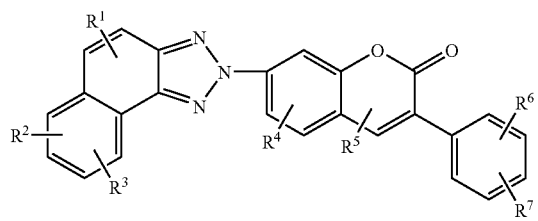

(2)

where
$R^1$, $R^2$, $R^3$, $R^4$, $R^5$, $R^6$ and $R^7$ mutually independently stand for H, alkyl, aryl, heteroaryl, halogen or a cyano group.

BACKGROUND OF THE INVENTION

Optical brighteners (herein OB) in polymers are known. The activity of a particular optical brightener depends on the polymer in which it is used. The combination of a particular polymer and a particular optical brightener must therefore go well with one another. The present invention provides new optical brighteners for polycarbonates and polyester carbonates.

WO 98/19862 discloses two-layer sheets made from polymers containing optical brighteners and UV absorbers in one of the two layers.

Hostalux® KCB is an optical brightener. Hostalux® KCB is 1,4-bis-(2-benzoxazolyl) naphthaline. It is available from Clariant GmbH, Frankfurt am Main, Germany. The use of Hostalux® KCB in $TiO_2$-containing powder coatings is described in WO 01/18130.

The use of Hostalux® KCB in white pigment-containing printing papers is described in JP-A 2001-010210 and in JP-A 03-065948.

The use of Hostalux® KCB in combination with other optical brighteners in PVC or EVA is described in EP-A 0 791 680.

The use of Hostalux® KCB in combination with other optical brighteners in polyesters is described in EP-A 0 240 461 and in Helvetica Chimica Acta (1978), 61, pages 488 to 500.

The use of Hostalux® KCB in combination with other optical brighteners in polyesters and polyamides is described in EP-A 0 136 259 and in EP-A 0 044 996 and in DE-A 19 55 310.

The use of Hostalux® KCB in combination with other optical brighteners in PVC is described in DE-A 33 13 332.

The use of Hostalux® KCB in combination with other optical brighteners in textiles is described in DE-A 26 29 703.

The use of Hostalux® KCB in polyester films is described in DE-A 38 18 986.

The use of Hostalux® KCB in laminated PVC films is described in DE-A 21 33 16.0.

Leukopur® EGM is an optical brightener. Leukopur® EGM is 7-(2H-naphtho[1,2-d]triazol-2-yl)-3-phenyl-2H-1-benzopyran-2-one. It is available from Clariant GmbH, Frankfurt am Main, Germany. The use of Leukopur® EGM in "UV-detecting compositions" is described in JP-A 01-169327.

The use of Leukopur® EGM together with other optical brighteners in polyolefins is described in WO 02/31035.

The use of Leukopur® EGM together with other optical brighteners in PVC is described in DE-A 33 13 332.

The use of Leukopur® EGM in PVC is described in JP-A 040 46 348.

The use of Leukopur® EGM in polyester fibres is described in JP-A 02-033321 and in JP-A 570 56 516 and in JP-A 620 48 690.

The use of Leukopur® EGM in acrylic fibres is described in JP-A 011 92 816.

The use of Leukopur® EGM in greenhouse films is described in DE-A 38 18 986.

The use of Leukopur® EGM in polystyrene is described in U.S. Pat. No. 4,404,300.

Brochures published by the manufacturer of Hostalux® KCB and Leukopur® EGM (for example "Technical Information Hostalux® KCB" published by Clariant GmbH, Frankfurt am Main, Germany) mention a number of applications. Polycarbonate is not mentioned. PVC, PS, PE, PP, cellulose acetate and EVA are mentioned.

Hostalux® KSB is a known optical brightener for polycarbonate. Hostalux® KSB is 2-[4-[2-[4-(2-benzoxazolyl) phenyl]ethenyl]phenyl]-5-methyl benzoxazole. It is available from Clariant GmbH, Frankfurt am Main, Germany. The use of Hostalux® KSB in polycarbonate is described in JP-A 2002-003710 and in JP-A 2001-214049 and in JP-A 10-316873 and in DE-A 197 24 638.

Uvitex® OB is a known optical brightener for polycarbonate. Uvitex® OB is 2,2'-(2,5-thiophenediyl)bis[5-(1,1-dimethylethyl)] benzoxazole. It is available from Ciba Spezialchemie, Lampertheim, Germany. The use of Uvitex®

OB in polycarbonate is described in JP-A 2002-003710 and in JP-A 2000-191918 and in JP-A 072 33 314.

Polycarbonate and polyester carbonate are often used in products that are exposed to weathering. It is therefore important that plastics containing polycarbonate and polyester carbonate have good weathering resistance. The weathering resistance of plastics also depends on the additives (for example optical brighteners) that are used in the plastics.

The known optical brighteners for polycarbonate and for polyester carbonate have the disadvantage of not being adequately resistant to weathering.

The object of the present invention is therefore to provide optical brighteners for polycarbonate and for polyester carbonate that have good weathering resistance.

DETAILED DESCRIPTION OF THE INVENTION

This object is achieved by a composition containing
a) a polymer selected from the group consisting of polycarbonate and polyester carbonate and
b) an OB compound selected from the group consisting of a compound according to formula I,

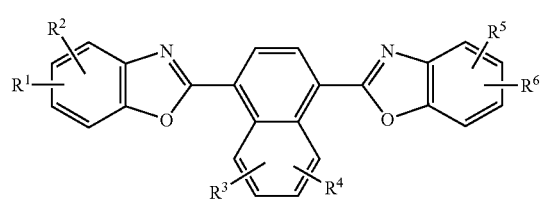

(1)

wherein
$R^1$, $R^2$, $R^5$ and $R^6$ mutually independently stand for H, alkyl, aryl, heteroaryl or halogen,
and wherein
$R^3$ and $R^4$ mutually independently stand for H, alkyl, aryl, heteroaryl or halogen,
and a compound according to formula 2,

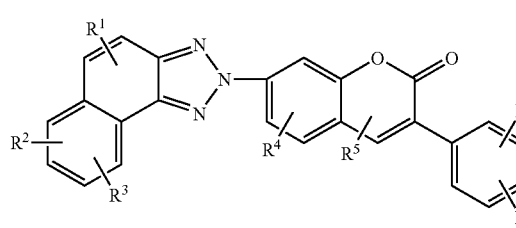

(2)

wherein
$R^1$, $R^2$, $R^3$, $R^4$, $R^5$, $R^6$ and $R^7$ mutually independently stand for H, alkyl, aryl, heteroaryl, halogen or a cyano group.

A particular embodiment of the present invention is this composition, wherein the polymer is selected from the group consisting of bisphenol A homopolycarbonate, bisphenol TMC homopolycarbonate, 4,4'-dihydroxydiphenyl homopolycarbonate and a copolycarbonate that contains more than 50 mol % repeat units, which are derived from a monomer selected from the group consisting of bisphenol A, bisphenol TMC and 4,4'-dihydroxydiphenyl.

Bisphenol TMC is 1,1-bis-(4-hydroxyphenyl)-3,3,5-trimethylcyclohexane and has the following formula (Me stands for a methyl group):

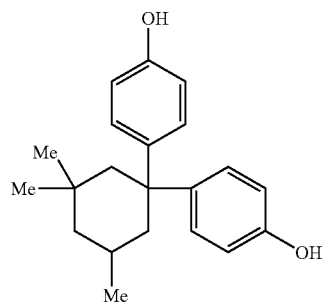

The polycarbonates may be derived from:
10-40 mol % 4,4'-dihydroxydiphenyl,
60-90 mol % bisphenol A,
0-30 mol % bisphenol TMC.

A particular embodiment of the present invention is the composition wherein the polymer is bisphenol A homopolycarbonate.

In a particular embodiment of the present invention the OB compound has the formula 1 wherein $R^1$, $R^2$, $R^5$ and $R^6$ mutually independently stand for H, $C_1$ to $C_{20}$ alkyl, $C_1$ to $C_{20}$ aryl, $C_1$ to $C_{20}$ heteroaryl or halogen, and wherein $R^3$ and $R^4$ mutually independently stand for H, $C_1$ to $C_{20}$ alkyl, $C_1$ to $C_{20}$ aryl, $C_1$ to $C_{20}$ heteroaryl or halogen.

In a particular embodiment of the present invention the OB compound has the formula 1 wherein $R^1$, $R^2$, $R^3$ $R^4$, $R^5$ and $R^6$ equal H.

In a particular embodiment of the present invention the OB compound has the formula 2 wherein $R^1$, $R^2$, $R^3$, $R^4$, $R^5$, $R^6$ and $R^7$ mutually independently stand for H, $C_1$ to $C_{20}$ alkyl, $C_1$ to $C_{20}$ aryl, $C_1$ to $C_{20}$ heteroaryl, halogen or cyano.

In a particular embodiment of the present invention the OB compound has the formula 2 wherein $R^1$, $R^2$, $R^3$, $R^4$, $R^5$, $R^6$ and $R^7$ equal H.

In a particular embodiment of the present invention the composition additionally contains UV absorbers.

Examples of UV absorbers are:
a) Benzotriazole derivatives:

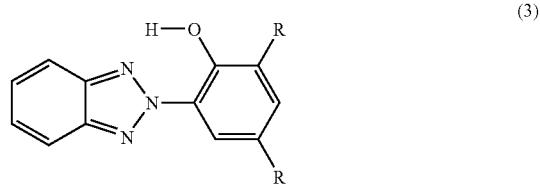

(3)

wherein
R and X are the same or different and are H or alkyl or alkyl aryl, b) Dimeric benzotriazole derivatives:

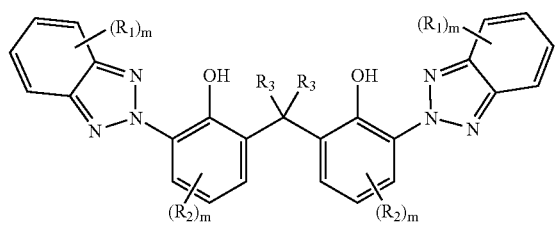

(4)

wherein
R$^1$ and R$^2$ are the same or different and denote H, halogen, C$_1$-C$_{10}$ alkyl, C$_5$-C$_{10}$ cycloalkyl, C$_7$-C$_{13}$ aralkyl, C$_6$-C$_{14}$ aryl, —OR$^5$ or —(CO)—O—R$^5$ where R$^5$=H or C$_1$-C$_4$ alkyl, R$^3$ and R$^4$ are the same or different and denote H, C$_1$-C$_4$ alkyl, C$_5$-C$_6$ cycloalkyl, benzyl or C$_6$-C$_{14}$ aryl, m is 1, 2 or 3 and
n is 1, 2, 3 or 4,

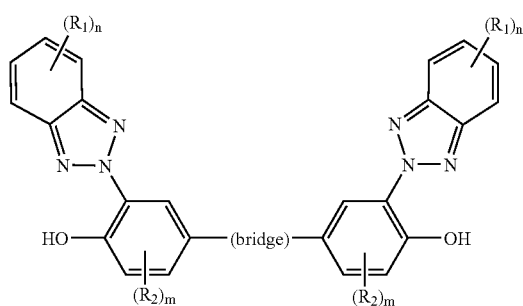

(5)

wherein the bridge denotes

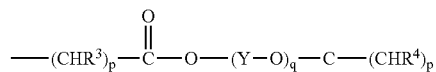

R$^1$, R$^2$, m and n have the meaning cited for formula (4), and wherein p is a whole number from 0 to 3,
q is a whole number from 1 to 10
y is —CH$_2$—CH$_2$—, —(CH$_2$)$_3$—, —(CH$_2$)$_4$—, —(CH$_2$)$_5$—, —(CH$_2$)$_6$— or CH(CH$_3$)—CH$_2$— and
R$^3$ and R$^4$ have the meaning cited for formula (II);

c) Triazine derivatives

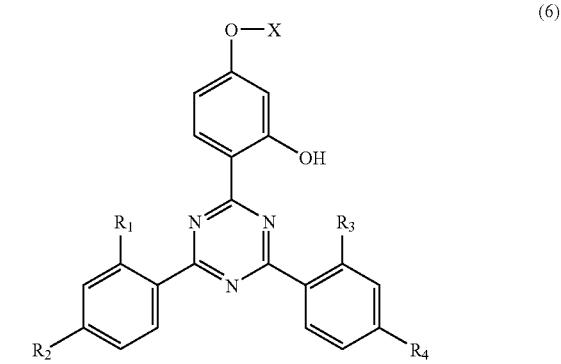

(6)

wherein
R$^1$, R$^2$, R$_3$, R$_4$ in formula (6) are the same or different and are H or alkyl or CN or halogen and
X=alkyl, d) Triazine derivatives as disclosed in EP-A 1 033 243, the indicated equivalent of which, U.S. Pat. No. 6,333,114 is incorporated herein by reference, e) Dimeric triazine derivatives

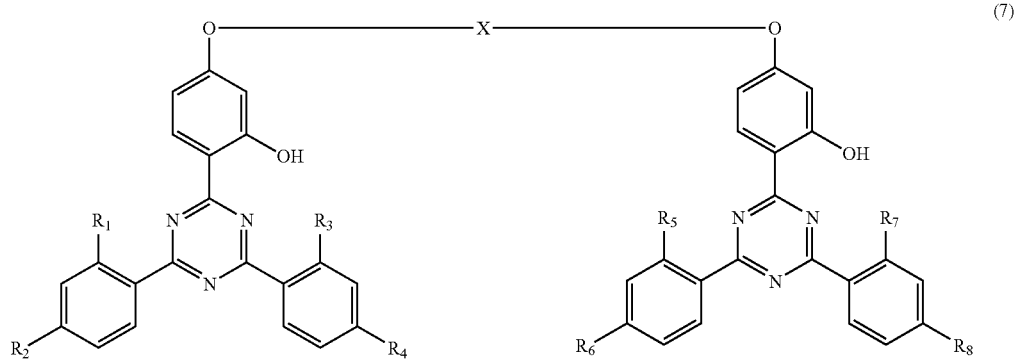

(7)

wherein
R₁, R₂, R₃, R₄, R₅, R₆, R₇, R₈ in formula (7) are the same or different and are H or alkyl or CN or halogen and X=alkyl or —(CH₂CH₂O—)n-C(=O)—, with n=1 to 20 f) Diaryl cyanoacrylates

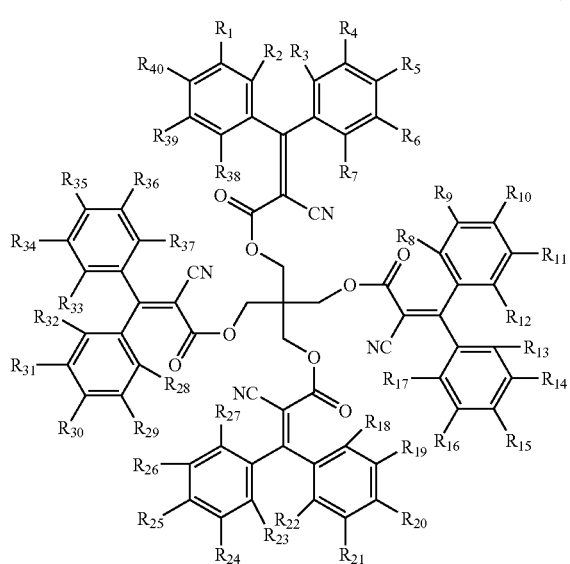

(8)

wherein
R₁ to R₄₀ are the same or different and are H, alkyl, CN or halogen, g) Diaryl cyanoacrylates having formula (9)

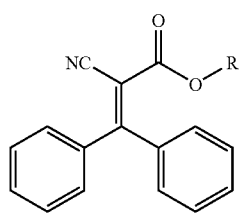

(9)

wherein
R equals C₂ alkyl to C₁₀ alkyl or aryl.
Uvinul 3035 where R=C₂H₅ and Uvinul 3039 where R=CH₂CH(C₂H₅)C₄H₉ are preferred.

In a particular embodiment of the present invention the composition additionally contains dyes and/or pigments. With regard to pigments, white pigments and light-scattering pigments (inorganic and/or organic) are preferred.

The compositions according to the invention preferably contain 0.0001 to 0.2 wt. %, particularly preferably 0.0003 to 0.1 wt. %, most particularly preferably 0.0005 to 0.05 wt. % of the OB compound.

If the compositions according to the invention contain UV absorbers, then they preferably contain them in the following weight ratio to the OB compound: UV absorber: OB compound=2000:1 to 10:1, particularly preferably: UV absorber: OB compound=1500:1 to 50:1, most particularly preferably: UV absorber: OB compound=1000:1 to 90:1.

In addition to the cited polymer, the compositions according to the invention may also contain other, additional polymers, such that there is a mixture (or blend) of the cited polymer and the other, additional polymers.

The compositions according to the invention preferably contain at least 50, particularly preferably at least 80, most particularly preferably at least 90 wt. % of the cited polymer.

In a particular embodiment, in addition to the cited polymers, the OB compound and optionally UV absorbers, the compositions according to the invention additionally contain only conventional auxiliary substances and additives.

In a particular embodiment, in addition to the cited polymers, the OB compound and optionally UV absorbers, the compositions according to the invention contain no other substances.

The composition according to the invention may be melt processed by injection moulding, extrusion, coextrusion or other methods. Products such as e.g. molded articles, sheets, profiles and pipes may thus be obtained. These articles may be single-layer or multi-layer.

The present invention therefore also provides a product containing the composition according to the invention.

This product may in particular be multi-layer and may contain the composition according to the invention in at least one layer.

This product can be selected in particular from the group consisting of sheet, profile or pipe.

A multi-layer product containing the composition according to the invention in an outer layer is particularly preferred. Multi-layer sheets that may be produced by coextrusion in particular are preferred.

Polycarbonates and polyester carbonates and their production are known.

The compounds according to formula 1 may be produced by known methods. They are disclosed for example in Liebigs Annalen der Chemie 1982, pages 1423 to 1433 and in U.S. Pat. No. 3,843,632 and in U.S. Pat. No. 3,993,659.

The compound according to formula 1 where R¹=R²=R³=R⁴=R⁵=R⁶=H is commercially available from Clariant GmbH, Frankfurt am Main, Germany under the trade name Hostalux® KCB.

The compounds according to formula 2 may be produced by known methods. They are disclosed for example in JP-A 480 37 970 and in JP-A 460 07 388 and in DE-A 19 09 182.

The compound according to formula 2 where R¹=R²=R³=R⁴=R⁵=R⁶=R⁷=H is commercially available from Clariant GmbH, Frankfurt am Main, Germany under the trade name Leukopur® EGM.

The compositions according to the invention have numerous advantages. By using the compounds according to the invention as optical brighteners in the same concentration as for optical brighteners of the prior art, the optical properties remain at a good level for longer when the compositions are exposed to weathering. The optically brightening effect likewise remains at a good level for a long time.

In addition, the fluorescence of the optical brighteners in the compositions according to the invention remains visible even after extended weathering periods. The compositions according to the invention therefore appear visually more attractive.

In addition, the yellowing of the compositions according to the invention due to weathering is less than in compositions such as are known from the prior art. The compositions according to the invention therefore appear visually more attractive.

EXAMPLES

1. Production of Compounds

Linear bisphenol A polycarbonate (Makrolon® 3108 from Bayer AG, Leverkusen, Germany with a melt flow rate (MFR) according to ISO 1133 of 6.5 g/10 min at 300° C. and 1.2 kg loading) was melted on an extruder and mixed (compounded) with 0.25 wt. % Tinuvin® 350 and 0.02 wt. % of the optical brightener referred to in Table 1.

TABLE 1

| Optical brightener used | |
|---|---|
| Compound no. | Optical brightener |
| 1 | Uvitex ® OB |
| 2 | Leukopur ® EGM |
| 3 | Hostalux ® KS-N |
| 4 | Hostalux ® KCB |

Compounds 2 and 4 are according to the invention. Compounds 1 and 3 are comparative experiments.

The following substances were used:

Uvitex® OB is 2,2'-(2,5-thiophenediyl)bis[5-(1,1-dimethylethyl) benzoxazole; it is available from Ciba Spezialchemie, Lampertheim, Germany.

Leukopur® EGM is 7-(2H-naphtho[1,2-d]triazol-2-yl)-3-phenyl-2H-1-benzopyran-2-one; it is available from Clariant GmbH, Frankfurt am Main, Germany.

Hostalux® KS-N is 2-[4-[2-[4-(2-benzoxazolyl)phenyl] ethenyl]phenyl]-5-methyl benzoxazole; it is available from Clariant GmbH, Frankfurt am Main, Germany.

Hostalux® KCB is 1,4-bis(2-benzoxazolyl) naphthaline; it is available from Clariant GmbH, Frankfurt am Main, Germany.

The structural formulae for these optical brighteners follow:

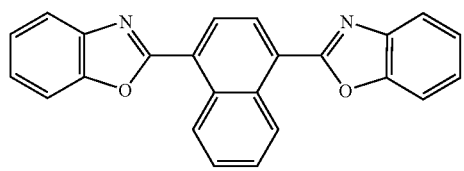

Hostalux®KCB

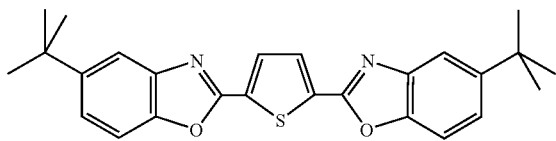

Uvitex®OB

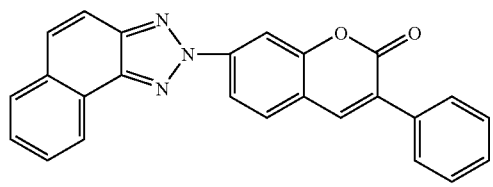

Leukopur®EGM

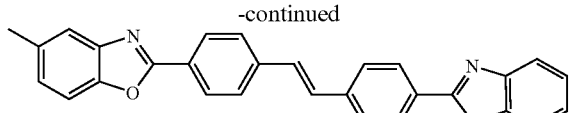

Hostalux®KS-N

2. Production of Specimens and Weathering

The aforementioned compounds were used to produce specimens (4 mm thick sheets, known as "4 mm colored specimens") by injection molding. These were subjected to artificial weathering and their weathering resistance was tested.

Weathering was performed in accordance with ISO 4892-2 using a CI 65A Weather-O-meter supplied by Atlas, USA, with a 6.5 kW xenon burner and a borosilicate/borosilicate filter at a radiation intensity of 0.5 W/m² at 340 nm. The weathering cycle was: 102 min exposure to light and 18 min exposure to light and spraying with demineralised water. The maximum black standard temperature was 60° C. (+/−5° C.).

TABLE 2 shows the results of the weathering:

| | Transmission (%) / Yellowness index | | |
|---|---|---|---|
| Compound no. | After 0 hours weathering | After 3500 hours weathering | After 6300 hours weathering |
| 1 | 86.8/3.4 | 70.8/14.1 | 64.6/16.6 |
| 2 | 87.0/4.4 | 71.8/14.3 | 65.0/16.1 |
| 3 | 86.9/4.6 | 71.1/18.6 | 64.4/21.1 |
| 4 | 86.2/3.5 | 73.6/11.7 | 65.2/13.7 |

The transmission was measured in accordance with the standards ASTM E 308 and ASTM D 1003. A Pye-Unicam device was used. The measurement geometry 0°/diffuse, calculated according to light type C, was used.

The yellowness index YI was determined in accordance with the standard ASTM E 313.

The fluorescence of the colored specimens was evaluated by placing them under a UV lamp and visually assessing the intensity of the blue fluorescent light.

TABLE 3 summarises the results:

| Compound no. | After 0 hours weathering | After 3500 hours weathering | After 6300 hours weathering |
|---|---|---|---|
| 1 | + | + | 0 |
| 2 | + | + | + |
| 3 | + | + | 0 |
| 4 | + | + | + |

Key:
+ = intense blue fluorescence
0 = slight blue fluorescence

The examples show that the fluorescence of the colored specimens according to the invention is visible even after long weathering periods. The colored specimens according to the invention therefore appear more attractive.

The examples also show that the yellowing of the colored specimens according to the invention is less than that of the comparative experiments. The colored specimens according to the invention therefore appear more attractive.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A light transmitting molded article comprising a composition comprising:
   a) a polymer selected from the group consisting of polycarbonate and polyester carbonate; and
   b) an optical brightener (OB) compound selected from the group consisting of a compound according to formula 1,

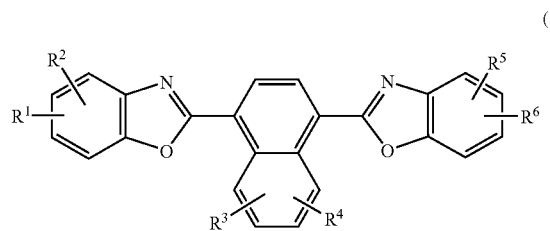

(1)

wherein $R^1$, $R^2$, $R^5$ and $R^6$ mutually independently stand for H, alkyl, aryl, heteroaryl or halogen,
and wherein $R^3$ and $R^4$ mutually independently stand for H, alkyl, aryl, heteroaryl or halogen,
and a compound according to formula 2,

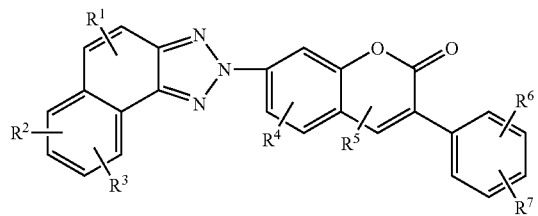

(2)

wherein $R^1$, $R^2$, $R^3$, $R^4$, $R^5$, $R^6$ and $R^7$ are each independently selected from the group consisting of H, alkyl, aryl, heteroaryl, halogen and a cyano group.

2. A multi-layer molded article wherein at least one layer of said multi-layer molded article is a transmitting layer and is made from a composition comprising a) a polymer selected from the group consisting of polycarbonate and polyester carbonate; and
   b) an optical brightener (OB) compound selected from the group consisting of a compound according to formula 1,

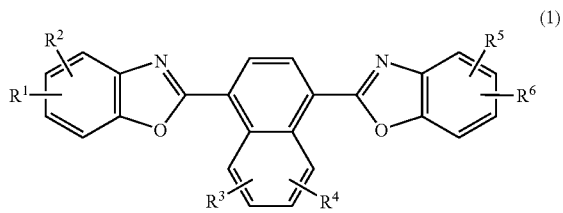

(1)

wherein $R^1$, $R^2$, $R^5$ and $R^6$ mutually independently stand for H, alkyl, aryl, heteroaryl or halogen,
and wherein $R^3$ and $R^4$ mutually independently stand for H, alkyl, aryl, heteroaryl or halogen,
and a compound according to formula 2,

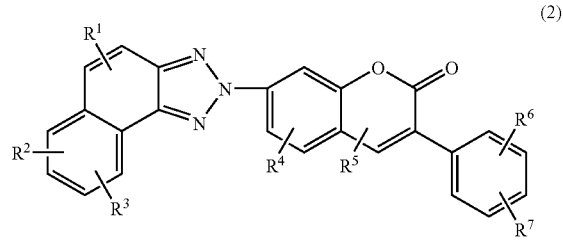

(2)

wherein $R^1$, $R^2$, $R^3$, $R^4$, $R^5$, $R^6$ and $R^7$ are each independently selected from the group consisting of H, alkyl, aryl, heteroaryl, halogen and a cyano group.

3. The molded article of claim 1 wherein said molded article has a form selected from the group consisting of sheet, profile and pipe.

4. The molded article of claim 1, the composition further comprising a UV absorber.

5. The molded article of claim 1, wherein the polymer is selected from the group consisting of bisphenol A homopolycarbonate, bisphenol TMC homopolycarbonate, 4,4'-dihydroxydiphenyl homopolycarbonate and a copolycarbonate that contains more than 50 mol % repeat units, which are derived from a monomer selected from the group consisting of bisphenol A, bisphenol TMC and 4,4'-dihydroxydiphenyl.

* * * * *